April 26, 1966   R. T. CORNELIUS   3,248,098
MEANS OF CARBONATING WATER
Filed Nov. 15, 1962
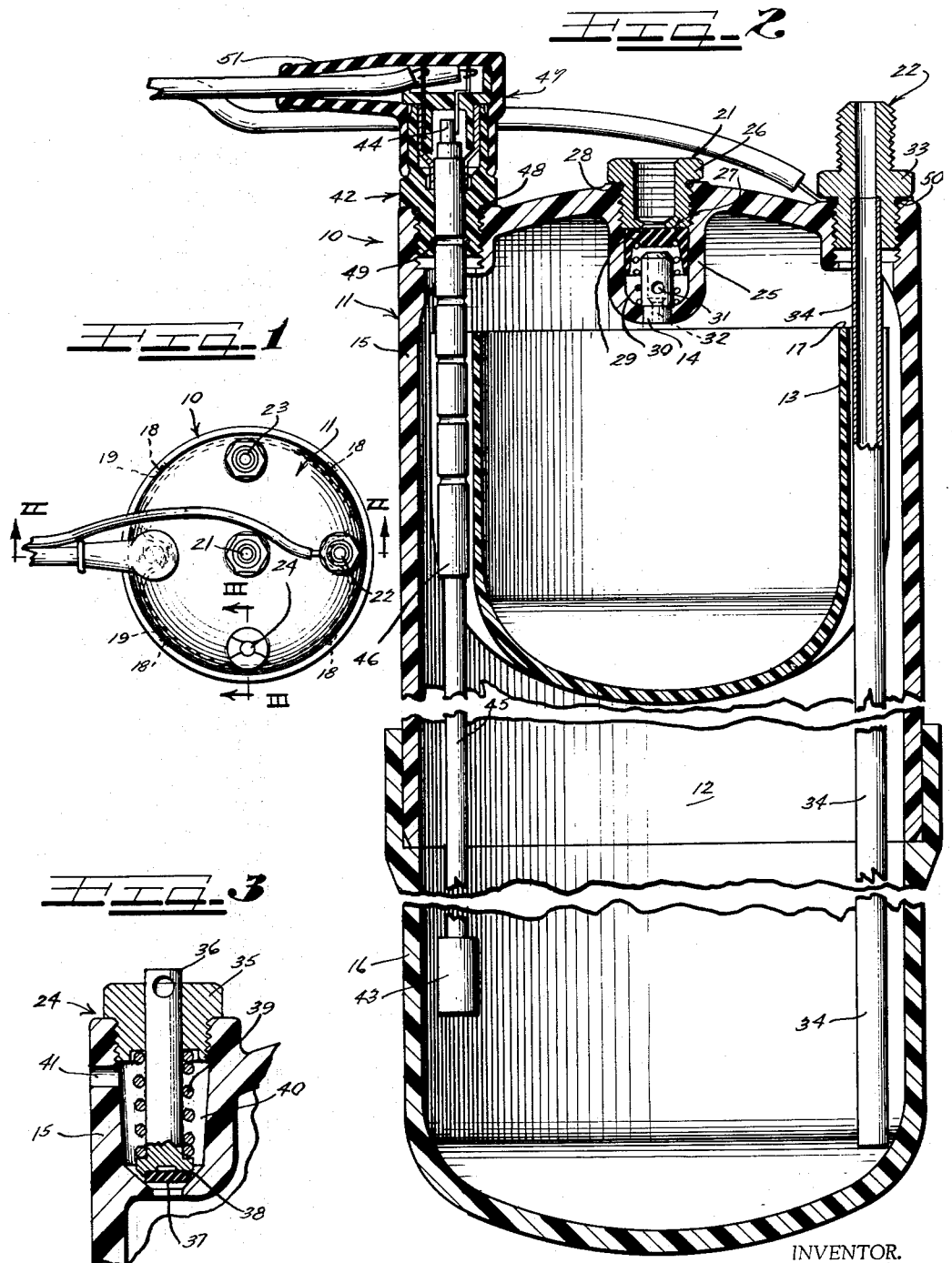
INVENTOR.
RICHARD T. CORNELIUS
BY
ATTORNEYS

United States Patent Office 3,248,098
Patented Apr. 26, 1966

3,248,098
MEANS OF CARBONATING WATER
Richard T. Cornelius, Minneapolis, Minn., assignor to The Cornelius Company, Anoka, Minn., a corporation of Minnesota
Filed Nov. 15, 1962, Ser. No. 237,942
4 Claims. (Cl. 261—115)

This invention relates generally to a means for carbonating a liquid, and more specifically to an improved device for carbonating water and for storing carbonated water.

Although the principles of the present invention may be utilized to carbonate various liquids, a particularly useful application is made when the same are applied to a means for carbonating water to be used as part of a beverage.

The amount of carbon dioxide which will stably remain in solution in a given quantity of water is dependent upon the storage temperature and pressure. Further, where the solution is unsaturated, it tends to absorb carbon dioxide gas which may be present. Certain previously known means for storing carbonated water have been less than satisfactory since the amount of carbon dioxide in solution has gradually changed as a function of storage time, thereby rendering the resulting beverage made therefrom unpredictable in quality.

Certain known carbonators have been so constructed that they actually rely on this principle for dissolving carbon dioxide in solution in the water. This type of carbonator has tended therefore to be unpredictable since the resulting product was largely a function of the carbonation time. A device operating on such principle could readily discharge water which was inadequately carbonated if it were used continually, and which might be excessively carbonated as a result of elapse of a period of non-use.

The present invention contemplates the provision of a means for carbonating a liquid such as water wherein the foregoing objections are eliminated or minimized. To that end, means are provided for substantially saturating water under pressure and temperature conditions also employed for storage, whereby the carbonator will provide a product having a degree of saturation which is substantially the same both during continual useage thereof, and after a period of non-use thereof. To this end, a jet of pressurized water is discharged through an atmosphere of carbon dioxide gas, preferably into a bowl of previously discharged water which is rendered turbulent by such jet, the bowl being constructed to overflow into a storage chamber exposed to the same pressure and temperature conditions existent during carbonation.

Accordingly, it is an object of the present invention to provide an improved means for carbonating a liquid.

Another object of the present invention is to provide a carbonator adapted to store the finished product under carbonating conditions of temperature and pressure, whereby the solution is stable during storage.

A still further object of the present invention is to provide a highly efficient means of carbonating water.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a top view of a carbonator provided in accordance with the principles of the present invention;

FIGURE 2 is an enlarged cross-sectional view taken along line II—II of FIGURE 1, and partially broken away; and FIGURE 3 is an enlarged fragmentary cross-sectional view taken along line III—III of FIGURE 1.

As shown on the drawings:

The principles of this invention are particularly useful when embodied in a device for carbonating a liquid, such as water, such a carbonator being illustrated in FIGURE 1, generally indicated by the numeral 10. The carbonator 10 includes a tank generally indicated at 11 which defines an internal pressure-tight chamber 12 shown in FIGURE 2 within which there is disposed and supported a bowl 13 aligned with a water jet nozzle 14.

As best seen in FIGURE 2, the tank 11 comprises a tank top 15 which defines the upper end of the chamber 12 as well as a portion of the lower or storage end of the chamber 12. The tank 11 further includes a tank bottom 16 which defines the remainder of the lower or storage end of the chamber 12. The tank top 15 and the tank bottom 16 may comprise plastic and have overlapping portions which are sealed together in any convenient method, such as by solvent cement.

The bowl 13 also may comprise plastic and is provided with an upper opening or mouth defined by an edge or a lip 17 which is spaced from the inner wall of the tank 11. Thus, when the bowl 13 is filled to overflowing, the additional water solution may flow over the edge or lip 17, down the outside of the bowl 13, and into the lower end of the chamber 12 for storage. The bowl 13 is provided with means of support such as a number of integral ears 18 on its outer surface, there being four such ears shown in FIGURE 1. The inner surface of the tank 11 is provided with compatible means to support the bowl 13, such as shoulder means 19 that provide a supporting and locating and retaining structure or pocket receptive of one of the ears 18, and thereby operative to dispose and support the bowl 13 in a predetermined relation immediately below the jet nozzle 14.

The upper end of the tank 11 is provided with means that define a water inlet 21, a carbonated water outlet 22, a carbon dioxide gas inlet 23, and a relief valve 24. The water ject nozzle 14 forms a part of the water inlet means 21 which is located centrally on the upper surface of the tank top 15. The carbon dioxide gas inlet means 23 is identical to the illustrated water inlet means 21, except the gas inlet means 23 is disposed at one side of the upper surface of the tank top 15, above the bowl 13. The structural description which follows for the water inlet means 21 is therefore applicable also to the gas inlet means 23.

The water inlet means 21 includes a threaded tank boss 25 which sealably supports an adaptor 26 which is adapted to be connected to a source of pressurized water, for example one having a pressure on the order of 100 p.s.i. The corresponding part of the gas inlet means 23 is thus adapted to be connected to a pressurized supply of carbon dioxide gas, the pressure being on the order of 28 p.s.i. Fluid is thus admitted through the appropriate adaptor 26 where it passes through a check valve generally indicated at 27 and thence to the jet nozzle 14. The adaptor 26 is provided with an O-ring 28 which forms a pressure-tight seal between the adaptor 26 and the tank top 15. The check valve 27 includes a piston seal 29 (shown in cross-section as rubber) which is biased at its skirt or lower perimeter of its own resilience into sealing engagement with the interior cylindrical wall of the boss 25 and which is biased by a spring 30 into sealing engagement with the end of the adaptor 26. Fluid pressure unseats the piston seal 29, forcing it against the inner end of the jet nozzle member 14; fluid pressure leaks past the upper end of the unseated piston seal 29, causing the skirt of the piston seal to move radially inward to enable a fluid flow along the outside of the piston seal and into an opening 31 which communicates with a central passage in the jet nozzle 14 that terminates at its lowermost end in a jet nozzle opening 32 which is directed downwardly into the bowl 13 through the mouth or opening thereof. Similarly, carbon dioxide gas is directed through a similar jet nozzle opening through the mouth of the bowl 13 near the edge or lip 17 thereof.

The carbonated water outlet means 22 comprises a suitable fitting 33 which is connected to a siphon tube 34, such as of stainless steel, which has a bottom end or outlet means disposed in the lower end of the chamber 12 for withdrawing carbonated water from the storage portion or reservoir. The outlet means 22 comprises a hollow electrical electrode having a further function described below.

The check valve 27 which forms a part of the water inlet means closes in response to a gas pressure which exceeds the inlet water pressure to prevent flow of carbon dioxide gas from the gas inlet 23 and out the water inlet 21. Similarly, the check valve 27 of the gas inlet 23 closes in response to a higher pressure existing within the chamber 12 to prevent flow of water from the water inlet means 21, out through the gas inlet means 23. Ordinarily, the interior of the chamber 12 is maintained at a pressure determined by the source of carbon dioxide gas, and therefore water at a higher pressure may be admitted at any time into the pressurized chamber 12. However, there is a substantial pressure drop at the water jet orifice 32 so that the higher water pressure does not tend to pressurize the carbonator 10 to any substantial extent.

In the event that both check valves 27 are closed and the pressure in the chamber 12 goes up, the relief valve 24 will limit the internal pressure to a predetermined value. The relief valve 24 includes a retaining bushing 35 which slidably guides a stem 36 carrying a seal 37 disposed against a seat 38 communicating with the chamber 12 in the tank 11. The seal 37 is biased into engagement with the seat 38 against the pressure within the chamber 12 by a spring 39 acting between the bushing 35 and a shoulder on the stem 36. The seat 38 also communicates, when open, with a relief valve cavity 40 having a discharge vent 41.

The carbonator 10 is used with means for controlling the amount of carbonated water stored therein, which means includes water-level responsive means or a level control assembly 42 supported at the upper end of the tank 11 and extending downwardly into the storage part of the chamber 12 into the lower end thereof. The level control assembly 42 comprises a carbon electrode 43 connected to an internal conductor 44 which is covered by an insulator 45, which in turn is surrounded by a stainless steel electrode 46. A low water level is sensed by interruption of a circuit from the electrode 43, through the carbonated water, to the electrode 34. High water level is sensed by the closing of a circuit from the electrode 46, through the carbonated water, to the electrode 34. Thus, the means 42 may be used to control the admission of pressurized water to the inlet 21 in accordance with the need for same.

The level control assembly 42 is provided with a suitable 2-conductor connector generally indicated at 47 which has internal terminals in contact with the conductor 44 and the electrode 46. The connector 47 may be rotated about the axis of the level control assembly 42 to any desired angular direction. Suitable O-rings are provided as indicated at 48, 49, and 50 to prevent leakage about any of the electrodes. A rubber boot 51 provides further mechanical and electrical protection for the electrical connections associated with the level control assembly 42.

The ambient temperature and pressure which are present in the bowl 13 where carbonation takes place are also present in the storage portion of the chamber 12. With the incoming high velocity jet of water creating a turbulent condition in the bowl 13 in the presence of carbon dioxide gas, the water is carbonated substantially to the level which is stable or saturated for the temperature and pressure at which the carbonated water is to be stored thereunder. With the passage of time, there is substantially no tendency for the stored carbonated water to either absorb additional carbon dioxide gas which is present above it, nor to give up carbon dioxide gas to the atmosphere above it. As a result, the length of time of storage of the carbonated water has no substantial effect on the quality of the product.

In a preferred embodiment, the disclosed device is constructed to such size that the carbonator will supply one faucet continually with carbonated water, even if it is not shut off. The disclosed carbonator can of course, supply quite a number of faucets which are used intermittently. Portions of FIGURE 2 are broken away to enable use of a relatively large scale of illustration, but if they were not broken away, the over-all length of the tank 11 could be about three and one-third times its diameter. The disclosed structure therefore further eliminates carbonation time even when the storage level is below the electrode 43 where the carbonator is used to supply one faucet continually. The relatively large storage or reserve capacity of the chamber 12 enables carbonated water to be withdrawn for a period of time at a rate faster than it is being replenished through a plurality of faucets, and also serves to minimize the frequency of or lengthen the interval between successive operating cycles.

The broad principles underlying my invention may be practiced by other structures, and to that end I wish to point out that my invention includes the method of discharging a pressurized jet of water into or through an atmosphere of substantially pure pressurized carbon dioxide gas, the jet of water being preferably directed into a bowl of previously discharged water which is disposed in the carbon dioxide atmosphere, the jet of water serving to agitate the resulting mixture in the bowl into a turbulent condition in which in the presence of the carbon dioxide gas, the water in the bowl efficiently absorbs a large quantity of carbon dioxide so that the same is highly carbonated as it overflows the bowl and is directed away to a storage chamber preferably maintained at the same pressure and temperature existent at the carbonating bowl. Where a large capacity storage of carbonated water is provided, the carbonation process thus described needs to be performed only intermittently, and regardless of the interval between carbonation and usage of the carbonated water, the product thus made is carbonated to a stable uniform high-quality extent.

Although various modifications might be suggested by those versed in the art, it should be understood that I wish to embody within the scope of the patent warranted hereon all such embodiments as reasonably and properly come within the scope of my contribution to the art.

I claim as my invention:
1. A carbonator comprising in combination:
  (a) a tank having an internal pressure-tight chamber provided with a carbon dioxide gas inlet means leading into said chamber;
  (b) an overflowable bowl disposed within said chamber and having an upwardly directed mouth defined by an edge thereof extending continually about the upper end thereof and along which edge water may overflow at a uniform depth, and a bottom comprising an upwardly directed concave surface;
  (c) lug and shoulder means integral with the outer surface of said bowl and the inner surface of said tank and supporting said bowl in the upper part of said chamber;
  (d) water jet-nozzle inlet means supported by said tank within said chamber and having a downwardly directed outlet at its lower end disposed above said bowl and directed to discharge a stream of water, through carbon dioxide gas in the upper part of said chamber, and through said mouth toward the center of said concave surface and directly from said nozzle into previously discharged water in said bowl for agitating it in the presence of the gas, whereby carbonated water may be collected and stored in the lower part of said chamber; and (e) low water-level and high water-level responsive means disposed in the storage part of said chamber for use in controlling starting and stopping of admission of water to said jet nozzle, said low and high water-level responsive means having in common a hollow electrode having an upper end extending out of said tank and a lower end extending to near the bottom of said tank and further serving as a carbonated water outlet means to conduct carbonated water out of said chamber.

2. A carbonator comprising in combination:
(a) a tank having an internal pressure-tight chamber provided with a carbon dioxide gas inlet means leading to said chamber, and carbonated water outlet means at the lower end of said chamber;
(b) an overflowable bowl disposed within said chamber and having an upwardly directed mouth defined by an edge thereof extending about the upper end thereof and along which edge water may overflow;
(c) lug and shoulder means comprising integral molded parts of the outer surface of said bowl and the inner surface of said tank and supporting said bowl in the upper part of said chamber;
(d) a water inlet jet nozzle supported by said tank within said chamber and having a downwardly directed outlet at its lower end disposed above said bowl and directed to discharge a stream of water, through carbon dioxide gas in the upper part of said chamber, and concentrically through said mouth directly from the nozzle into previously discharged water in said bowl for agitating it in the presence of the gas, and
(e) water-level responsive means disposed in the storage part of said chamber for use in controlling admission of water to said jet nozzle.

3. A carbonator comprising in combination:
(a) a tank having an internal pressure-tight chamber provided with a carbon dioxide gas inlet means leading into said chamber;
(b) a water inlet jet nozzle supported by said tank within said chamber and having a downwardly directed outlet at its lower end directed to discharge a stream of water, through carbon dioxide gas in the upper part of said chamber directly from the nozzle into previously discharged carbonated water stored in said chamber; and
(c) low water-level and high water-level responsive means disposed in the storage part of said chamber for use in controlling starting and stopping of admission of water to said jet nozzle, said means comprising a first electrode responsive to high water level, a second electrode concentric with and supported insulatedly by said first electrode and responsive to low water level, and a third electrode immersed in water at both high and low levels and comprising a hollow electrode coactive with each of said first and second electrodes, said third electrode having an upper end extending out of said tank and a lower end extending to near the bottom of said tank and further serving as a carbonated water outlet means to conduct carbonated water out of said chamber.

4. A carbonator comprising in combination:
(a) a tank having an internal pressure-tight chamber provided with a carbon dioxide gas inlet means leading into said chamber;
(b) an overflowable bowl supported within said chamber and having an upwardly directed mouth defined by an edge thereof and a bottom comprising an upwardly directed concave surface;
(c) a water inlet jet nozzle supported by said tank within said chamber and having a downwardly directed outlet at its lower end disposed above said bowl and directed to discharge a stream of water, through carbon dioxide gas in the upper part of said chamber directly from the nozzle into previously discharged carbonated water stored in said chamber; and
(d) low water-level and high water-level responsive means disposed in the storage part of said chamber for use in controlling starting and stopping of admission of water to said jet nozzle, said low and high water-level responsive means having in common a hollow electrode having an upper end extending out of said tank and a lower end extending to near the bottom of said tank and further serving as a carbonated water outlet means to conduct carbonated water out of said chamber.

References Cited by the Examiner

UNITED STATES PATENTS

| | | | |
|---|---|---|---|
| 526,252 | 9/1894 | Moackler | 261—115 |
| 552,482 | 12/1895 | Maguire. | |
| 677,580 | 7/1901 | Madlener | 261—115 |
| 697,723 | 4/1902 | Irwin et al. | |
| 1,055,648 | 3/1913 | Murphy | |
| 1,272,299 | 7/1918 | Murphy. | |
| 2,339,640 | 1/1944 | Holinger. | |
| 2,435,774 | 2/1948 | Di Pietro. | |
| 2,708,945 | 5/1955 | Hirsch | 222—76 X |
| 2,732,117 | 1/1956 | Hillis | 222—76 X |
| 2,735,720 | 2/1956 | Evert | 261—115 |
| 3,100,810 | 8/1963 | Meyer | 261—115 |

FOREIGN PATENTS 17,033 of 1910 Great Britain.

HARRY B. THORTON, *Primary Examiner.*

RONALD R. WEAVER, *Examiner.*